United States Patent [19]

Londono

[11] Patent Number: 4,899,429

[45] Date of Patent: Feb. 13, 1990

[54] SCREEN INSTALLER TOOL

[76] Inventor: Gustavo Londono, 9117 Tivoli Pl., Boca Raton, Fla. 33434

[21] Appl. No.: 234,555

[22] Filed: Aug. 22, 1988

[51] Int. Cl.[4] .......... B23P 19/02

[52] U.S. Cl. .......... 29/235; 29/270; 29/278

[58] Field of Search .......... 29/110.5, 116, 235, 29/270, 278; 140/109

[56] References Cited

U.S. PATENT DOCUMENTS

| | | | |
|---|---|---|---|
| 739,342 | 9/1903 | Peregrine | 29/270 |
| 3,077,907 | 2/1963 | Gottlieb | 140/109 |
| 3,307,249 | 3/1967 | Hohoff | 29/235 |
| 4,172,313 | 10/1979 | Takahashi | 29/235 |
| 4,578,851 | 4/1986 | Song | 29/235 |
| 4,765,771 | 8/1988 | Howsley | 29/235 |

*Primary Examiner*—Judy J. Hartman

*Attorney, Agent, or Firm*—Harry W. Barron

[57] ABSTRACT

A screen installer tool includes a handle, a front portion and a rear portion. A circular disk is affixed to the front portioned and a second circular disk is affixed to the rear portion, each of which rotate as the screen installer tool is moved in a forward direction. The front roller has a convex edge and the thickness of the front roller is selected to fit within the channel of a screen frame, whereby the screen is formed in the channel as the tool is moved forward. The back roller has a concave edge for receiving and inserting a pliable spline material into the formed screen within the channel as the tool is moved. A spline path is provided from the back end of the tool to permit the spline material to easily inserted into the tool around the back roller as the tool moves forward and an idler roller, under spring tension, is provided to hold the spline material against the back roller.

19 Claims, 3 Drawing Sheets

SCREEN INSTALLER TOOL

This invention relates to a portable screen installer tool, and more particularly, to such a tool which, during a single continuous operation, may be used to bend a screen into a screen holder channel and to insert a pliable spline member for holding the screen.

It has long been know that one technique holding a screen material in a frame is to provide a narrow channel in the frame and bend the screen to fit within the channel. Thereafter, a pliable spline material, such as rubber, is inserted into the channel holding the bent screen wire for permanently affixing the screen to the frame.

In the past, portable hand tools have been developed to assist a workman in affixing a screen material to the screen frame. Examples of such tools are shown in U.S. Pat. Nos. 739,342 and 739,343, both in the name of Peregrine and U.S. Pat. No. 4,241,487 in the name of Kraver. Other machines, such as shown in U.S. Pat. No. 3,077,907 in the name of Gottlieb, have been developed for installing screen in a frame in an automated fabrication line, but such machines are of little use to a workman installing a screen while in the field, such as, for example, at a customer's home.

Two major problems exist with the prior art. The first problem, typical of the portable tools, such as shown in the two Peregrine or the Kraver patents, is that two steps are required of the workman in order to install the screen. First, one side of the prior art portable tool is used to bend the screen into the channel of the frame and, after this has been completed, the opposite side of the tool is used to insert the pliable spline into the channel containing the formed screen. The second problem is that a machine which installs the screen in a single step involves bulky and complex apparatus, such as shown in the Gottlieb patent, and is not easily adaptable to be taken into the field by a workman needing to repair or replace existing screen on, for example, a conventional household window or door screen.

What is needed is a simple portable tool which can be easily carried by a workman and which can install a screen in a frame in a single pass.

In accordance with one aspect of this invention, there is provided a screen installing tool for installing screen into a screen holder channel of the type in which the screen is bent into the channel opening and a pliable strip is inserted against that portion of the screen bent into the channel to hold the screen therein. The tool includes a frame having a bottom and a first circular disk rotatably positioned at a point within the frame and having a convex edge extending from the frame bottom. The first disk edge is sized to fit within the channel. In addition, the tool includes a second disk rotatably positioned about a point within the frame and having a concave edge extending from the frame bottom. The second disk is totally remote from the first disk and offset in a direction perpendicular to the channel when the tool is in use. Finally, the tool includes a feeding path for the pliable strip through the frame and around a portion of the second disk edge.

One preferred embodiment of the subject invention is hereafter described, with specific reference being made to the following Figures, in which.

Figure 1:
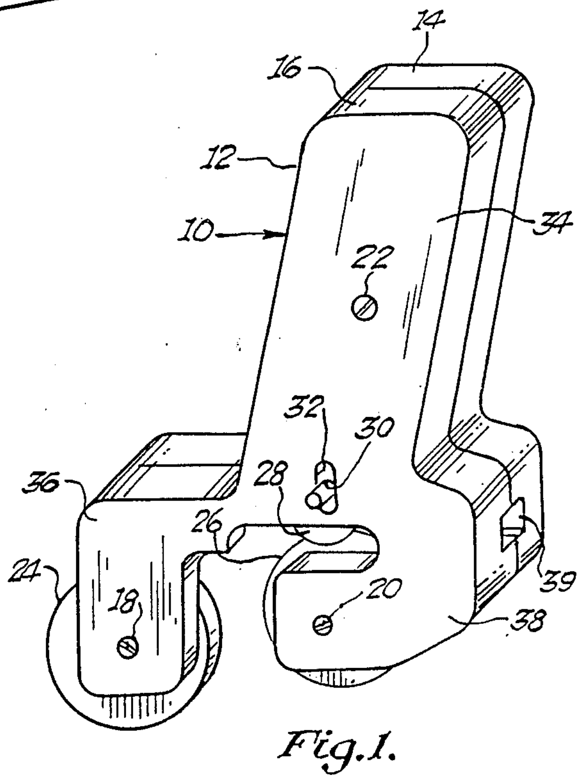
FIG. 1 is a perspective view of the screen installer tool of the subject invention.

Referring now to FIG. 1, screen installer tool 10 of the subject invention is shown in perspective. Tool 10 includes a frame 12, having right side 14 and a left side 16, both fabricated from sheet plastic material, with right side 14 being approximately one half inch thick and left side 16 being approximately one fourth inch thick. The two sides 14 and 16 are held together by blots 18, 20, and 22.

In addition, tool 10 includes a front roller 24, a back roller 26 and an idler roller 28 rotatably positioned in cutout between left and right sides 14 and 16. A handle 30 extends from the center of idler roller 28 through a slot opening 32 and idler roller 28 is slidably bias against back roller 26 by a spring and shaft position within cutouts between sides 14 and 16. Frame 12 further includes a handle 34, front extension 36 and back extension 38. Front roller 24 is affixed in front extension 36 and rotates about bolt 18 through its center. Similarly back roller 26 is affixed by bolt 20 in back extension 38 and rotates therein. The cutouts in both front extension 36 and back extension 38 are sufficient to receive and permit easy rotation of rollers 24 and 26. An opening to the spline path 39 is positioned on the outer end of back extension 38 through which spline material is feed around back roller 26.

Figure 2:
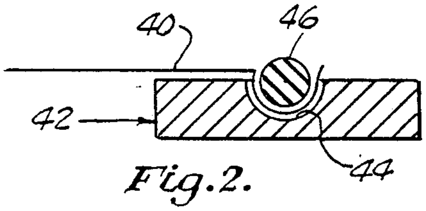
FIG. 2 is a cross sectional view of the manner in which screen is attached to a frame.

Referring now to FIG. 2, a representation is shown of how a screen 40 is held in a screen frame 42. Frame 42 has a channel 44 formed therein which runs along the periphery of the area to be screened. In order to affix screen 40 into channel 44, screen 40 is bent to be form fit within channel 44 along its entire length. Thereafter, a pliable material, such as rubber, spline 46 is inserted into channel 44, over the bent portion of screen 40. Spline 46 is sized to hold screen 40 firmly within channel 44 by the natural expansion thereof after insertion in channel 44.

Figure 3:
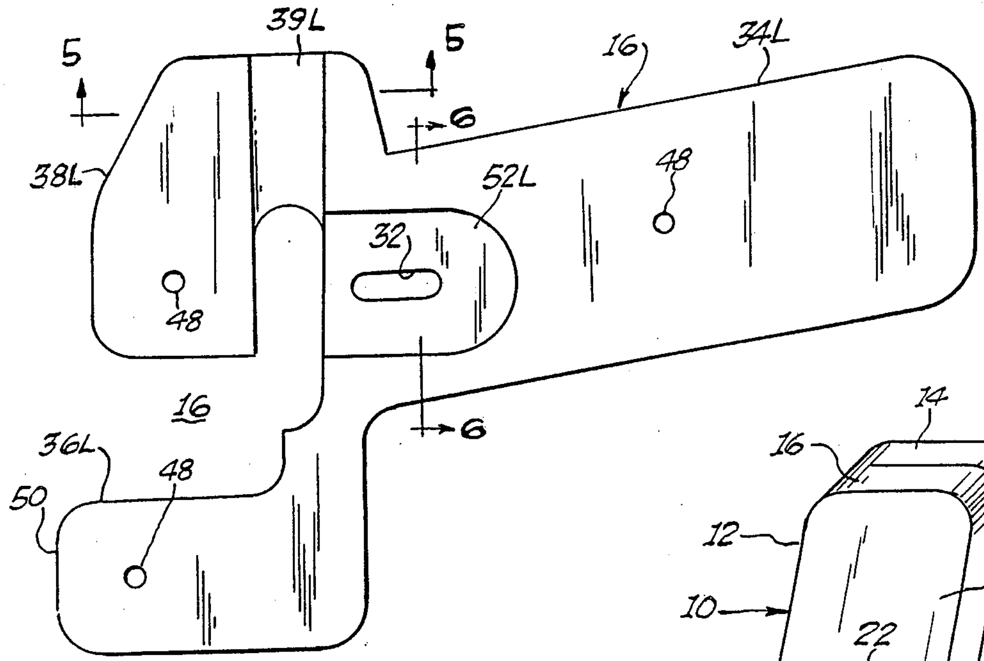
FIG. 3 is a plan view of the interior of one side of the frame of the screen installer tool shown in FIG. 1.
Figure 4:
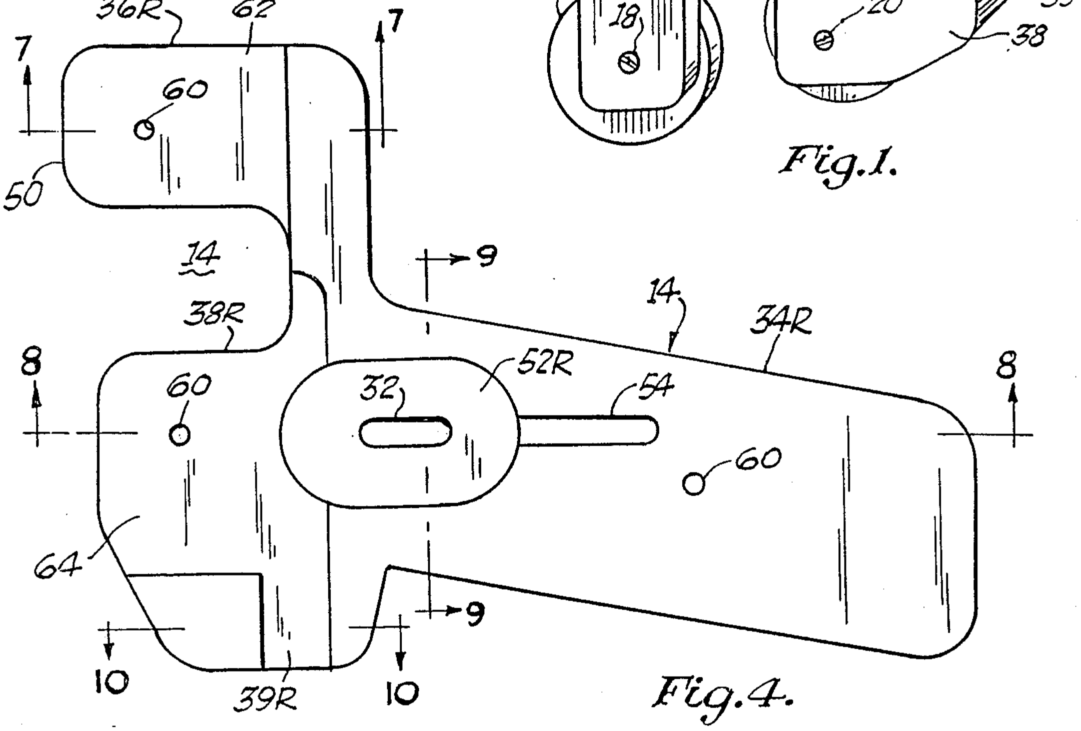
FIG. 4 is a plan view of the interior of the other side of the screen installer tool shown in FIG. 1.
Figure 5:
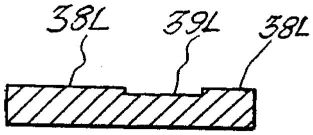
FIG. 5 is a cross sectional view taken across line 5—5 of FIG. 3.
Figure 6:
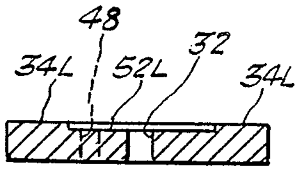
FIG. 6 is a cross sectional view taken across lines 6—6 of FIG. 3.
Figure 7:
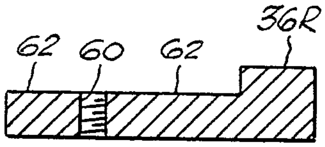
FIG. 7 is a cross sectional view taken across lines 7—7 of FIG. 4.
Figure 8:
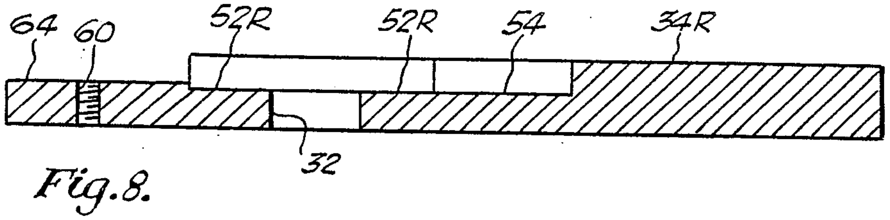
FIG. 8 is a cross sectional view taken across lines 8—8 of FIG. 4.
Figure 9:
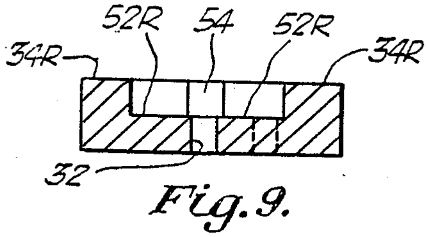
FIG. 9 is a cross sectional view taken across lines 9—9 of FIG. 4.

Referring now to FIGS. 3–10, the detailed structure of frame 12 will be described. FIGS. 3, 5, and 6 show the left side 16 of frame 12 with the interior facing side shown in FIG. 3 and cross sectional views take along lines 5—5 and 6—6, respectively, shown in FIGS. 5 and 6. FIGS. 4, and 7-10 show the right side 14 of frame 12, with FIG. 4 showing the interior facing side and FIGS. 7, 8, 9, and 10 respectively showing cross sectional views taken through respective lines 7—7, 8—8, 9—9, and 10—10 of FIG. 4.

Referring specifically to FIGS. 3, 5, and 6, the interior surface of left side 16 of frame 12 will now be described. Generally, the left side 16 is a one fourth inch thick plastic member cut as shown in FIG. 3 to include handle 34, front extension 36 and back extension 38. Three holes 48 are provided to receive the blots 18, 20, and 22 and sized so that bolts 18, 20, and 22 slide therethrough. The left most side of front extension 36 in Figure forms the bottom 50 of tool 10. As seen best in FIG. 14, the lower edge of back extension 38 and the hole 48 associated with back extension 38 are offset, in a direction perpendicular to channel 44 when tool 10 is used, from respective bottom 50 and hole 48 associated with front extension 36. The amount of the offset for the two holes 48 respectively associated with front section 36 and back section 38 is determined by the thickness of channel 44 and spline 46. It is desired that the front roller 24 affixed to hole 48 in front extension 36 rides at the bottom of channel 44, whereas the edge of back roller 26 rides slightly above the upper surface of frame 42, in order to insert spline 46 into the screen filled channel 44.

As seen in FIGS. 3 and 5, a slight recess 39L is fabricated on extension 38L of the interior surface of left side 16 to form spline path 39. Another slight recess 52L is formed around slot 32 and is sized to permit idler roller 38 to slide therein. Recess 52L has parallel sides separated by the diameter of idler roller 28 and a semicircular portion from the end of slot 32 remote from the bottom 50 having a radius equal to the radius of idler roller 28. The handlers 30 of idler roller 28 fit through slot 32 and extend outward from tool 10 for grasping by the user in order to be able to slide idler roller 28.

Figure 14:
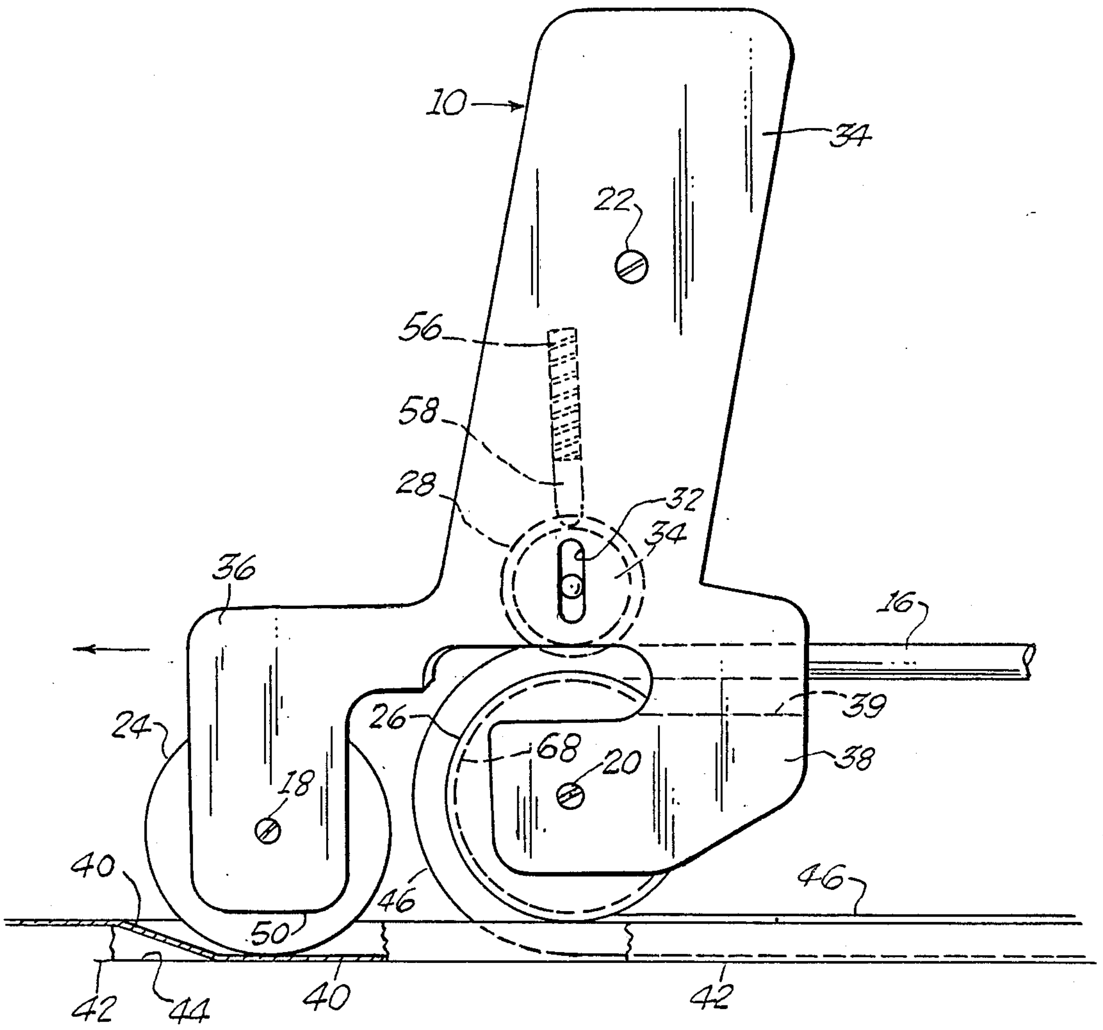
FIG. 14 is plan view showing the screen installer tool in use for installing a screen in a frame.

Referring now to FIG. 4, the interior surface of the right side 14 of frame 12 is shown. As seen, recesses 39R and 52R are fabricated in the interior surface of right side 14 and are aligned with corresponding recesses 39L and 52L when the interior surfaces of left side 16 and right side 14 are placed together. Recesses 52L and 52R are of a sufficient depth to permit idler roller 28 to easily slide therein without undue lateral movement. In addition, a spring slot recess 54 is provided from the end of recess 52R remote from bottom 50 and extends in a direction aligned with slot 32. As seen in FIG. 14, a spring 56 and guide 58 are inserted into slot 54 to provide a bias tension, in a direction towards bottom 50, against idler roller 28 when inserted in the space formed by recesses 52L and 52R.

Right side 14 includes three threaded holes 60 aligned with holes 48 when right side 14 and left side 16 are placed together. Blots 18, 20, and 22, thus, are inserted through unthreaded holes 48 and secured into threaded holes 60. As seen from FIG. 1, front roller 24 and back roller 26 are held by bolts 18 an 20. To provide the space for rollers 24, recess 62 is fabricated in front extension 36, and to provide space for roller 26, recess 64 is fabricated in back extension 38. The amount of recess 62 and 64 is equivalent to the thickness of the front roller 24 and back roller 26 respectively. As will be discussed hereafter, back roller 26 is slightly thicker front roller 24, so recess 64 is slightly greater than recess 62. Further, as can be seen in FIG. 4 the amount of recess 52R is even greater than recess 64 due to the greater thickness of idler roller 28.

Figure 11:
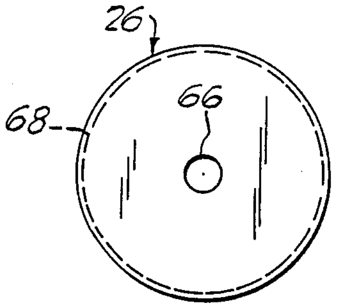
FIGS. 11 and 11A are a side and edge view of the back roller used in the screen installer tool shown in FIG. 1.
Figure 11A:
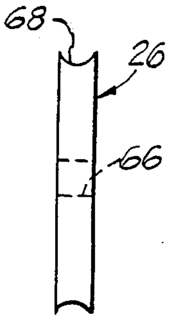
Figure 10:
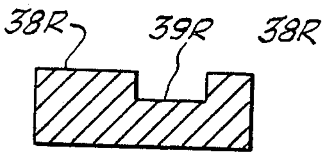
FIG. 10 is a cross sectional view taken across lines 10—10 of FIG. 4.
Figure 12:
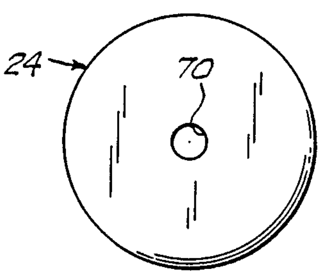
FIGS. 12 and 12A are a side and edge view of the front roller used in the screen installer tool shown in FIG. 1.
Figure 13:
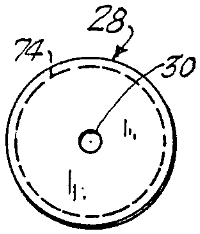
FIGS. 13 and 13A are a side and edge view of the idler roller used in the screen installing tool shown in FIG. 1.

Referring now to FIGS. 11, 12, and 13, the detailed structure of the front roller 24, back roller 26 and idler roller 28 will now be described. Back roller 26, which is shown in FIGS. 11 and 11A, is approximately three sixteenths of an inch in thickness and includes a center hole 66 therein, which is sized to permit bolt 20 to slide therethrough so that back roller 66 rotates about blot 20. The diameter of back roller 26 may be one and five-eighths of an inch inches. Recess 64, into which roller 26 is positioned, is slightly greater than the 3/16 thickness of back roller 26 to permit back roller 26 to rotate freely. As best seen in FIG. 11A, the edge 68 of back roller 26 is concave in shape so as to permit back roller 26 to roll over spline 46, as seen best in FIG. 14.

Figure 12A:
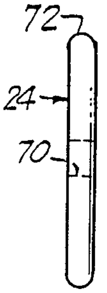

Front roller 24 is shown in FIGS. 12 and 12A and is a circular disk object with a hole 70 therein adapted to have bolt 18 slide therethrough so as to permit free rotation about bolt 18. The edge 72 of front roller 24 is convex in shape and front roller 24 has a thickness sufficient to permit it to fit within channel 44 shown screen frame 42. In practice the thickness of front troller may be one eighth of a inch and the diameter of front roller 24 may be one and five-eighths of an inch. Thus, recess 62 is slightly greater than one eighth of an inch.

Figure 13A:
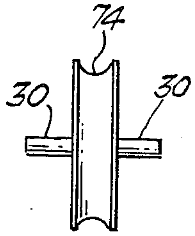

Referring now to FIGS. 13 and 13A, idler roller 28 is shown and includes handle 30 through the axis thereof. The length of handle 30 is selected so that it extends through slot 32 and beyond the outer surface of right side 14 and left side 16. The edge 74 of idler roller 28 is concave in shape and thickness of idler roller 28 may be one fourth of a inch so that idler roller 28 may be fit around the edges 68 of back roller 26 when the two are juxtaposed to one another. Idler roller 28 may have a diameter of approximately one and one eighth of an inch. Recess 52L and 52R, shown in FIGS. 3 and 4, together are slightly greater than the one fourth of an inch thickness of idler roller 28. To make idler roller aligned with back roller 26, recess 52L is one thirty-second of an inch and recess 52R is one thirty-second of an inch greater than recess 64. The lower circular portion of recess 52R, toward bottom 50, is positioned to prevent idler roller 28 from being moved forward to such an extent that it actually touches back roller 26.

Referring now to FIG. 14, the manner of using tool 10 will now be described. In affixing screen 40 to screen frame 42, one must first form and fit the ends of screen 40 into channel 44. Thereafter spline 46 must be inserted over the formed screen in channel 44. To accomplish these two functions with a single pass, tool 10 is inserted with the convex edge of front roller 24 fitting over the screen and into channel 44. In addition, the spline material is inserted through spline path opening 39 and around the concave edge of back roller 26 to the bottom thereof. Spline 46 is held against back roller 26 by idler roller 28 due to the spring 56 and guide 58 tension against idler roller 28. As seen in FIGS. 3 and 14, left side 16 of frame 12 is cut to expose the spline 46 as it is positioned between back roller 26 and idler roller 28.

Tool 10 is then moved forward so that front roller 24 and back roller rotate about bolts 18 and 20 respectively. As this occurs additional screen 40 is formed into channel 44 by front roller 24. Immediately following the forming of screen into channel 44, the spline material 46 is forced into the channel containing the formed screen by back roller 26 rolling over the fed spline material. Downward pressure is constantly applied to tool 10 as it is rolled forward, thereby forming the screen 40 into channel 44 and inserting the spline material 46 over the formed screen in channel 44.

By using tool 10 as described above, the screen ends are formed into channel 44 and the spline material is then inserted over the formed screen within channel 44 with single pass of tool 10.

What is claimed is:

1. A manually movable screen installing tool for installing screen into a screen holder channel of the type in which the screen is bent into the channel opening and a pliable strip is inserted against that portion of the screen bent in the channel to hold the screen therein, said tool comprising:

- a frame including a bottom;
- a first circular disk rotatably positioned at a point within said frame and having a convex edge extending from said frame bottom, said first disk edge being sized to fit within said channel for bending said screen into said channel as said tool moves along a path following said channel;
- a second disk rotatably positioned about a point within said frame and having a concave edge extending from said frame bottom, said second disk being totally remote from said first disk and offset in a direction perpendicular to said channel when said tool is in use; and
- a feeding path for said pliable strip through said frame and around a portion of said second disk edge, said second disk inserting said strip into said channel above said bent screen as said tool moves along said path following said channel.

2. The invention according to claim 1 wherein said frame further includes a handle opposite to said bottom.

3. The invention according to claim 1 wherein said feeding path includes a third disk biased against said second disk, said pliable strip being positioned between said second and third disks.

4. The invention according to claim 3 wherein said third disk is positioned remote from said bottom.

5. The invention according to claim 3 wherein said frame further includes a handle opposite to said bottom and said third disk is positioned in said handle.

6. The invention according to claim 3 wherein said third disk is spring biased.

7. The invention according to claim 3 wherein said feeding path extends from a position behind said second disk to between said second and third disks and around the front of said second disk within the concave edge thereof.

8. The invention according to claim 7 wherein the rotation of said second disk feeds said pliable strip through said feeding path.

9. The invention according to claim 7 wherein the edge of said second disk is wider than the edge of said first disk.

10. The invention according to claim 9 wherein the edge of said third disk is wider than the edge of said second disk.

11. The invention according to claim 1 wherein the rotation of said second disk feeds said pliable strip through said feeding path.

12. The invention according to claim 11 wherein the edge of said second disk is wider than the edge of said first disk.

13. The invention according to claim 11 wherein the edge of said third disk is wider than the edge of said second disk.

14. The invention according to claim 1 wherein said feeding path extends from a position behind said second disk and around the front of said second disk within the concave edge thereof.

15. The invention according to claim 14 wherein the rotation of said second disk feeds said pliable strip through said feeding path.

16. The invention according to claim 14 wherein the edge of said second disk is wider than the edge of said first disk.

17. The invention according to claim 1 wherein said tool is moved in a direction following said channel with said first disk inserted over said screen and in said channel and said second disk positioned above said screen and channel, said first and second disks rotating as said tool is moved.

18. The invention according to claim 17 wherein said feeding path extends from a position behind said second disk and around the front of said second disk within the concave edge thereof.

19. The invention according to claim 18 wherein the rotation of said second disk feeds said pliable strip through said feeding path.

* * * * *